Dec. 24, 1968   W. A. THORNTON, JR   3,418,248
PREPARATION OF ELECTROLUMINESCENT PHOSPHORS
Filed Aug. 16, 1965

WITNESSES
Theodore F. Wrobel
James F. Young

INVENTOR
William A. Thornton, Jr.
BY W. D. Palmer
ATTORNEY

3,418,248
PREPARATION OF ELECTROLUMINESCENT
PHOSPHORS
William A. Thornton, Jr., Cranford, N.J., assignor to Westinghouse Electric Corporation, Pittsburgh, Pa., a corporation of Pennsylvania
Filed Aug. 16, 1965, Ser. No. 480,012
6 Claims. (Cl. 252—301.6)

ABSTRACT OF THE DISCLOSURE

A method of preparing superior zinc sulphide electroluminescent phosphor by low temperature activation of photoluminescent material. Copper acetate or copper chloride is added to the photoluminescent material in predetermined amounts and the resulting mixture is baked in an atmosphere comprising oxygen at from 350° to 700° C. for a time sufficient to render the material electroluminescent.

---

Figure 1:
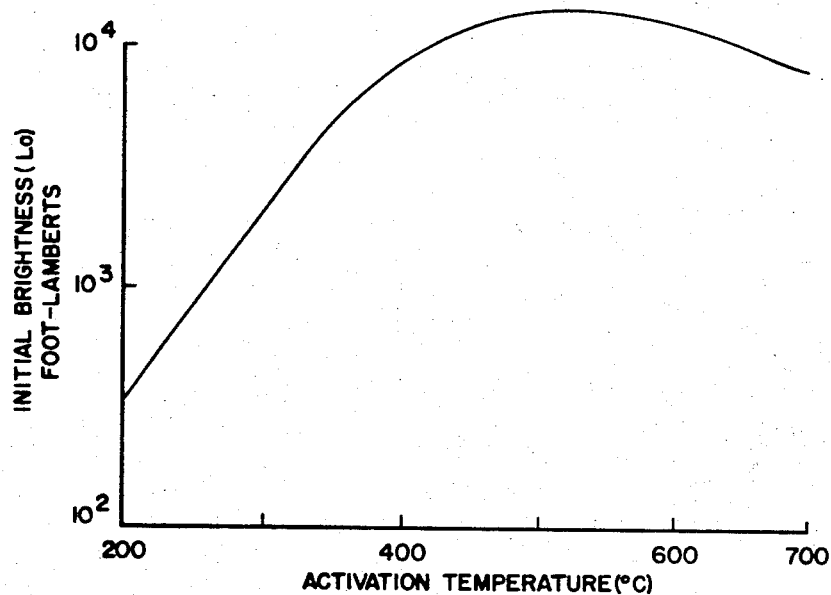

The present invention relates to the method of producing finely divided electroluminescent phosphors having exceptionally high brightness characteristics under excitation by an alternating electric field.

It is now well known in the art that a matrix of certain materials, such as zinc sulphide, or mixtures thereof with zinc oxide, cadmium sulphide or the like, are made electroluminescent by the addition of small amounts of preselected activators, such as copper, chlorine or bromine coactivator, and manganese, ranging in definite proportions. In forming the phosphor, the raw-mix constituents are baked at relatively high temperatures ranging from about 700° C. to 1000° C. for periods of 1 hour to 15 hours, for example, depending upon the particular temperature employed. Such firing is done in an inert or sulphurizing atmosphere or one including one of the coactivators in gaseous form. This single firing serves both for growth and formation of the crystals and for incorporation of the activators which make the crystal electroluminescent. These prior methods of preparing electroluminescent phosphors require the lengthy single firing step at a compromise temperature between the high temperatures required for crystal formation and the low temperature required for activation, and are thus time consuming, which contributes very materially to their manufacturing costs.

The present invention accordingly provides a method of producing finely divided electroluminescent phosphors which is more economical than those heretofore employed because of the lower baking temperature required and wherein the prepared phosphors have particularly high electroluminescent brightness.

Another object of the present invention is the provision of a method for producing finely divided electroluminescent phosphors wherein the prefired phosphor composition need be fired for only a relatively short period of time in air, thus materially reducing manufacturing costs.

A further object of the present invention is the method of producing a finely divided electroluminescent phosphor of high efficiency by low-temperature activation rather than high-temperature activation.

In accordance with the present invention a non-electroluminescent phosphor, such as copper-activated zinc sulphide phosphor is first prepared and which may be strongly photoluminescent in the yellow-green and possesses long phosphorescence. As an example, this is accomplished by adding from $10^{-5}$ to 0.1 mol percent copper, calculated with respect to the zinc sulphide, and from $10^{-4}$ to 20 mol percent chlorine, and preferably 0.03% Cu; 0.3% Cl, to the zinc sulphide and firing at a high temperature of from 1000° C. to 1300° C. for a period of from ten to thirty minutes. This resulting non-electroluminescent phosphor is then contacted with a copper compound, such as copper chloride or copper acetate in a distilled water solution, with such compound ranging from 0.01 mol percent to 10 mol percent and preferably at 0.5 mol percent, as calculated with respect to the zinc sulphide. The mixture of the phosphor matrix with its wetted activator solution is then baked in air at from about 350° C. to 700° C., and preferably at 500° C. The period of baking is not critical, although it is important that the photoluminescent phosphor and contacting copper compound be heated throughout to a temperature within the indicated range. In order to insure that the photoluminescent phosphor and contacting copper compound reach a temperature within this range, it is preferred to heat the phosphor at a temperature within this range for a period of at least fifteen minutes. The length of the baking time is not critical, although at the upper end of the baking temperature range, there will be an increasing tendency for oxidation. Thus the higher the baking temperature within the foregoing range, the shorter the baking time should be.

Figure 2:
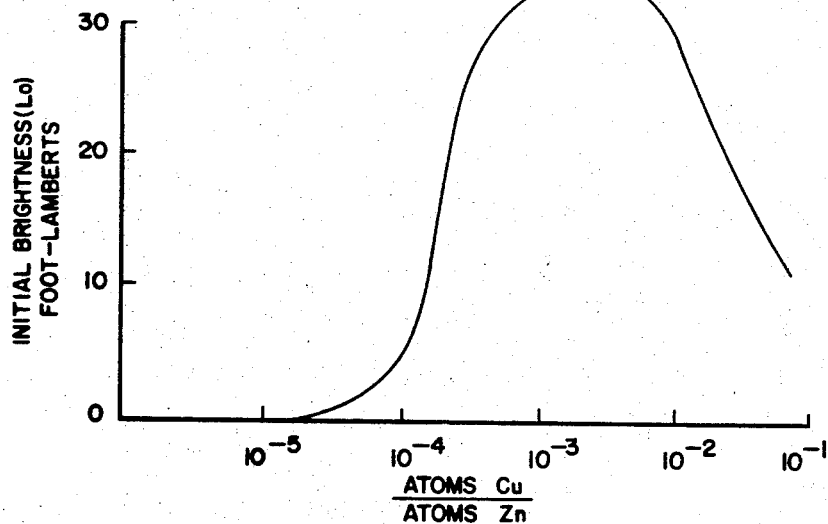

This procedure accordingly changes the photoluminescence to a brilliant blue-white, the phosphorescence completely disappears and such resulting phosphor has strong electroluminescence in the blue-white region. The use of copper acetate results in the phosphor having somewhat greater electroluminescent brightness than with the copper chloride and such phosphor possesses a steep slope curve of brightness vs. voltage, with little marked color shift with frequency. The ensuing result may be better appreciated by reference to the accompanying drawing wherein:

FIGURE 1 is a graphic illustration depicting initial brightness as a function of activation temperature, and FIGURE 2 is a graphic illustration showing brightness as a function of the proportion of copper in terms of atoms of copper to atoms of zinc, added before the second firing.

Referring now to some examples, six non-electroluminescent phosphors of different matrix were converted by this method using copper acetate as the activator introducer, with observations made of each one of the six different matrix phosphors all of which were untreated and treated in the above mentioned manner. While the mole percentage of copper in the phosphor matrix varied from .03% to .1 and that of chlorine from 1.0% to 10.0%, all of such untreated phosphors remained non-electroluminescent yet photoluminescent while their phosphorescence varied from nil to long. However, upon activation by the CuAc solution in the manner above mentioned, all such treated phosphor thereupon exhibited electroluminescence varying from strong blue-white to moderate blue and moderate green while in most instances losing phosporesence entirely. Such treatment thus establishes the surprising fact that the resulting electroluminescent phosphor is not a contact phenomenon but actually low temperature activation, with the copper apparently diffusing into the crystal well below the surface and causing the shift toward blue emission.

The foregoing may be better appreciated from the following specific examples:

EXAMPLE 1

Zinc sulphide plus 0.03 mol percent copper and 0.3 mol percent chlorine was fired at 1100° C. for half an hour, after which it showed strong green photoluminescence and some after glow, but no electroluminescence. About 0.5 mol percent of copper acetate was added in distilled water solution and the combination baked in air for an hour at 500° C., followed by the usual cyanide wash. The electroluminescence brightness of this phosphor was twice the brightness of an equivalent phosphor made by the conventional method.

EXAMPLE 2

Zinc sulphide plus 4 mol percent cadmium plus 0.1 mol percent silver was fired at 1100° C. for half an hour, after which it showed blue-green photoluminescence but no electroluminescence. About 3 mol percent copper acetate was added in distilled water solution and the combination baked in air for thirty minutes at 500° C., followed by the usual cyanide wash. The phosphor then showed strong blue-white electroluminescence.

EXAMPLE 3

Zinc sulphide plus 3 mol percent manganese and 0.3 mol percent chlorine was fired at 1100° C. for half an hour, after which it showed strong yellow photoluminescence but no electroluminescence. About 3 mol percent copper acetate was added in distilled water solution and the combination baked in air for an hour at 500° C., followed by the unusual cyanide wash. The resulting phosphor then showed yellow electroluminescence shifting to blue at high frequency. Baking in an inert gaseous environment such as pure nitrogen was also tried but this gave an electroluminescent brightness of only 70% compared with air-bake.

Fabrication of the phosphors referred to in the foregoing examples thus gives rise to the curves shown by the graphs of FIGS. 1 and 2. In FIG. 1 the abscissa represents Activation Temperature in degrees centigrade while the ordinate depicts Initial Brightness ($L_o$) in terms of foot-lamberts. It will thus be seen from FIG. 1 that optimum initial electroluminescent brightness results when the phosphor matrix is air-baked at approximately 550° C. Also from FIG. 2, wherein the ordinate again represents Brightness ($L_o$) in footlamberts and the abscissa the proportion of copper (atoms of Cu/atoms of Zn) added to the initially nonelectroluminescent phosphor, it should be apparent that the cyanide washed phosphors produced optimum electroluminescence when the added copper compound approximates 0.5 mol percent as above mentioned.

It should thus be apparent from the foregoing that a method of producing an electroluminescent phosphor has been described wherein a non-electroluminescent phosphor, which is photoluminescent, is made electroluminescent at lower manufacturing cost. This is accomplished by baking the non-electroluminescent phosphor in air at the much lower temperature of 350° C. to 700° C. for a sufficient time to cause the photoluminescent phosphor and contacting copper compound to be heated throughout to a temperature within this range. The resulting electroluminescent phosphor is accompanied by a very striking color shift to a blue-white fully comparable to that produced by high temperature firing in a selected gaseous atmosphere, of the entire crystal bulk.

While air is the preferred baking atmosphere, the atmosphere used in baking can be any atmosphere comprising oxygen. The cyanide wash referred to hereinbefore comprises a washing solution which is a good solvent for cuprous sulphide, but which is not a good solvent for zinc sulphide. A specific example of such a washing solution and other suitable washing solutions are specified in U.S. Patent No. 3,140,999, dated July 14, 1964.

Although a specific embodiment of the present invention has been herein shown and described, it is to be understood that still further modifications thereof may be made without departing from the spirit and scope of the invention.

I claim:

1. The method of producing an electroluminescent phosphor material from photoluminescent but nonelectroluminescent phosphor composed essentially of zinc sulphide, which method comprises:
   (a) adding to said non-electroluminescent zinc sulphide phosphor copper acetate or copper chloride in an amount such that the copper added is in an amount of from about 0.01 mol percent to 10 mol percent of said zinc sulphide, and
   (b) baking the resulting mixture in an oxygen containing atmosphere at a temperature of from about 350° C. to 700° C. for a period of time of at least fifteen minutes.

2. The method as specified in claim 1, wherein said temperature is preferably 550° C.

3. The method as specified in claim 1, wherein said baking is for a time sufficient to diffuse said added copper into said zinc sulphide and thereby render same electroluminescent.

4. The method of producing finely divided electroluminescent phosphor material from finely divided photoluminescent but non-electroluminescent copper-activated zinc sulphide phosphor matrix, which method comprises:
   (a) adding to said finely divided non-electroluminescent phosphor matrix a solution of copper acetate or copper chloride wherein the copper ranges from about 0.01 mol percent to 10 mol percent of said zinc sulphide, and is preferably about 0.5 mol percent of said zinc sulphide,
   (b) baking the resulting mixture in an oxygen containing atmosphere for a period of at least fifteen mintues and at a temperature of from about 350° C. to 700° C. with the higher the baking temperatures the shorter the baking time, and
   (c) thereafter washing said baked phosphor in a material which is a good solvent for cuprous sulphide but which is not a good solvent for zinc sulphide.

5. The method of producing finely divided electroluminescent phosphor material from finely divided photoluminescent but non-electroluminescent copper-activated zinc sulphide phosphor, which method comprises:
   (a) adding to said finely divided non-electroluminescent phosphor a solution of copper chloride wherein the copper ranges from about 0.01 mol percent to 10 mol percent of said zinc sulphide, and is preferably about 0.5 mol percent of said zinc sulphide,
   (b) baking the resulting mixture in an oxygen-containing atmosphere for a period of at least fifteen minutes and at a temperature of from about 350° C. to 700° C. with the higher the baking temperature the shorter the baking time, and
   (c) thereafter washing said baked phosphor in a material which is a good solvent for cuprous sulphide but which is not a good solvent for zinc sulphide.

6. The method of producing finely divided electroluminescent phosphor material from finely divided electroluminescent but non-electroluminescent copper-activated zinc sulphide phosphor, which method comprises:
   (a) adding to said finely divided non electroluminescent phosphor a solution of copper acetate wherein the copper ranges from about 0.01 mol percent to 10 mol percent of said zinc sulphide, and is preferably about 0.5 mol percent of said zinc sulphide,
   (b) baking the resulting mixture in an oxygen-containing atmosphere for a period ranging from about thirty minutes to two hours and at a temperature of from about 350° C. to 700° C. with the higher the baking temperature the shorter the baking time, and
(c) thereafter washing said baked phosphor in a material which is a good solvent for cuprous sulphide but which is not a good solvent for zinc sulphide.

References Cited

UNITED STATES PATENTS

| | | | |
|---|---|---|---|
| 2,957,830 | 10/1960 | Goldberg et al. | 252—301.6 |
| 2,980,627 | 4/1961 | Swindells | 252—301.6 |
| 2,982,740 | 5/1961 | Goldberg et al. | 252—301.6 |
| 2,999,818 | 9/1961 | Morrison et al | 252—301.6 |

FOREIGN PATENTS 782,095  9/1957  Great Britain.

TOBIAS E. LEVOW, *Primary Examiner.*

ROBERT D. EDMONDS, *Assistant Examiner.*